E. R. Osgood,
Sawing Shingles,
N° 65,001. Patented May 21, 1867.
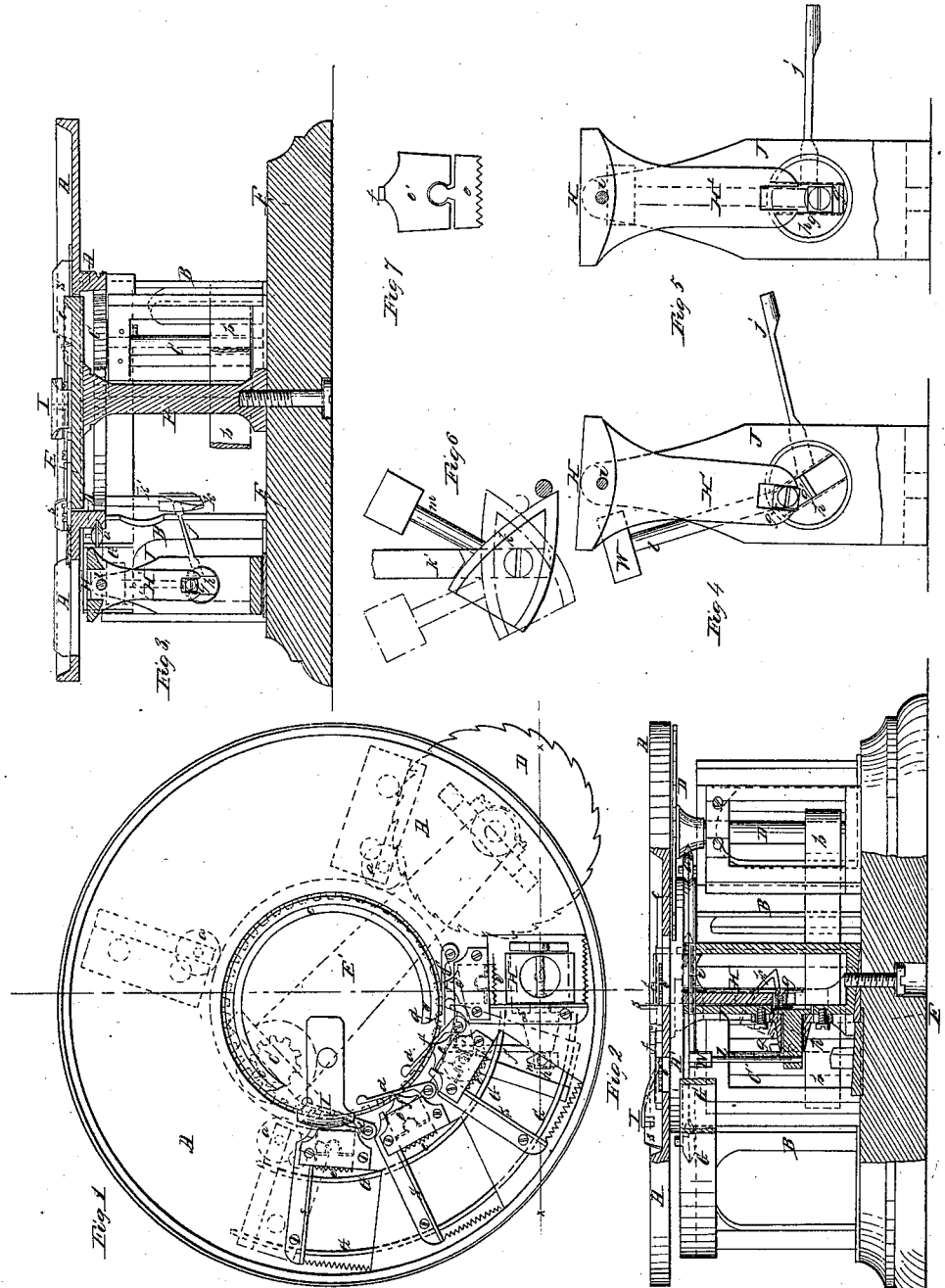

United States Patent Office.

ELIJAH R. OSGOOD, OF COLUMBUS, OHIO.

Letters Patent No. 65,001, dated May 21, 1867.

---

IMPROVEMENT IN SHINGLE MACHINES.

---

The Schedule referred to in these Letters Patent and making part of the same.

---

TO ALL WHOM IT MAY CONCERN:

Be it known that I, ELIJAH R. OSGOOD, of Columbus, in the county of Franklin, and State of Ohio, have invented certain new and useful improvements in Machinery for Sawing Shingles from bolts; and I do hereby declare that the following is a full, clear, and exact description thereof, reference being had to the accompanying drawings, making a part of this specification, in which—

Figure 1 is a plan view of the improved machine.

Figure 2 is a section through the machine, taken in the vertical plane indicated by red line $x\ x$.

Figure 3 is a section through the machine taken in the vertical plane indicated by red line $y\ y$ Figure 4 is an enlarged view of the bolt-table arranged to receive an oscillating movement.

Figure 5 is a view showing the same table arranged to maintain a horizontal position.

Figure 6 shows the tripping-lever for moving the bolt-table.

Figure 7 is a view of one of the griping-dogs for holding the bolts.

Similar letters of reference indicate corresponding parts in the several figures.

This invention relates to certain novel improvements in machinery which is designed for sawing shingles from bolts, in which a horizontal rotating table or carriage is employed for carrying the bolts around the saw, in conjunction with contrivances for releasing the bolts, tilting them, and then clamping them to the table again so as to properly feed the bolts to a position to be cut by the saw.

The nature of my invention consists in applying fixed and movable jaws or dogs to the bolt-spaces of a revolving carriage, and in griping the bolts between such jaws at proper times by means of a centrally fixed cam, acting upon pivoted spring-arms that press upon the movable jaws; also in releasing the bolts by means of an eccentric cam, which is so arranged as to retract the movable dogs at proper times and allow the bolts to drop upon a stationary frame and be moved along to the tilting-table, as will be hereinafter described. It also consists in oscillating the table upon which the bolts are dropped to be adjusted, by means of an oscillating-cam, which moves with the rotary carriage, and a vibrating spring-arm, which is applied to an oscillating-shaft of the bolt-table so that this table will be automatically caused to assume the desired inclinations for adjusting the bolts properly to the saw; and in conjunction with such arrangement it also consists in providing for adjusting the bolts in planes parallel to the saw for sawing stuff into boards of equal thickness, as will be hereinafter described, To enable others skilled in the art to understand my invention, I will describe its construction and operation.

In the accompanying drawings, A represents a circular carriage, to which the bolts or blocks from which the shingles are sawed are clamped. This circular carriage is supported in a horizontal position by means of small wheels $a\ a$, the peripheries of which are made so as to enter a V-shaped groove which is formed around the circumference of a circular flange, A', that surrounds the central opening through said carriage. There is a number of the wheels $a$ used, and they are supported by means of the frames B B, shown in figs. 2 and 3. These wheels $a$ not only support the bolt-carriage A, but hold it down in place and at the same time allow it to be rotated. On the inner edge of the concentric flange A' spur-teeth are formed, which engage with a pinion spur-wheel, C, on the upper end of a vertical shaft, C', which latter receives a rotary motion from the vertical saw-shaft D by means of a belt, $b$. A central shaft, E, projects up from the foundation F, and has a circular plate, E', secured on its upper end, which plate just fills the opening through the centre of the carriage A, and its top surface is level with the corresponding surface of this carriage, as shown in fig. 3. On the circumference of the plate E' a ridge, $c$, is formed, which projects above its surface and extends nearly around it, as shown in fig. 1. The object of this ridge or cam $c$ is to cause the spring-arms $d\ d$ to press the sliding-dogs $e\ e$ into the bolts so as to hold these bolts during the operation of the saw D', and until the bolts have been moved around by their carriage A and brought over the curved ways G, when the ridge $c$ ceases to act upon the spring-arms $d$, and does not again act upon them until the bolts have been moved from the ways G upon an oscillating-table, H. The circular-bolt carriage A is constructed with a number of rectangular openings through it, which are somewhat larger than the bolts from which the shingles are sawed. These openings are arranged at regular distances apart around the axis of the carriage so as to carry around said axis the bolts which are clamped within them, during which revolution the bolts are successively presented to the saw D' and shingles cut from them. Those edges of the bolt openings which are nearest the circumference of the carriage A are serrated for firmly griping and holding the outer ends of the bolts, and directly opposite these jaws are the movable griping-jaws or dogs $e\ e$, which gripe and hold the inner ends of the bolts, except when the bolts are over the ways G. In order to have the griping edges of the dogs $e\ e$ accommodate themselves to the ends of the bolts and firmly hold them, I pivot these dogs to the plates $e'$, as shown in fig.

7, which pivot will allow each portion $e$ to fit squarely against the end of a bolt and to embed itself equally therein. The inner ends of the portions $e'$ have lips formed on them, which lips $f$ project up short distances so as to be caught by the stationary retractor I as they successively pass this point, which retractor will draw back the dogs and release the bolts so as to allow them to drop down upon the concentric ways G, shown in figs. 1 and 2. On one side of each sliding-dog $e$ a short spring-arm, $d$, is pivoted upon the surface of the carriage A, which arm lies obliquely across its sliding portion $e$ of the dog $e$, as shown in fig. 1. These spring-arms $d$ are of such length that they are pressed outward by the ridge $c$, and thus caused to force their respective dogs into the ends of the bolts. The ridge $c$ terminates at one end just before the bolts are brought over the ways G, in order to allow the retractor I to release the bolts. The ridge $c$ again commences to act upon the spring-arms $d$ when the bolts have been brought upon the table H, and immediately before they, the bolts, are presented to the saw D'. When the bolts are dropped upon the horizontal ways G by the withdrawal of the dogs $e$ they are pushed along upon these ways by the carriage A and brought upon the inclined table H, which adjusts them in a proper position before the dogs again gripe them.

For sawing tapering shingles from the bolts the table H is oscillated so as to present different inclined planes in the following manner: The table H is pivoted at $i$ to a standard, J, and constructed with an arm, H', projecting downward, and having its lower end forked, as shown in figs. 3, 4, and 5. In the forked end of the arm H' a square block, $g$, is fitted, which block is secured by a set-screw to a sliding-block, $g'$, that is fitted into a dove-tail slot extending diametrically across the end of a rock-shaft, $h$, which has its bearings in frame J. When the said set-screw is loosened the block $g$ can be adjusted up or down, and when necessary moved out of the fork in arm H', as shown in fig. 5, in which latter case the table H will be free to assume a horizontal position, and will not be moved by the rocking of shaft $h$. On the outer end of the rock-shaft $h$ a spring-arm, $j$, is secured, which projects inward a short distance so as to operate upon an oscillating V-shaped tripping-toe, $k$. Another arm, $l$, is secured to the shaft $h$, and projects upward, and has a weight, W, applied to its upper end, as shown in fig. 2. The oscillating movement of the shaft $h$ is regulated by means of a slot in the tubular projection of the bearing of this shaft, so that the loaded arm $l$ vibrates an equal distance past a vertical plane intersecting the axis of shaft $h$. The toe $k$ is pivoted to a pendant, $k'$ projecting down from the bottom edge of the flange A', and to this toe a loaded arm, $m$, is secured for holding it in the position shown in black lines, fig. 6, or in the position indicated in red lines in this figure. The toe $k$ is arranged in such relation to the shaft $h$, when brought near this shaft, that the spring-arm $j$ will be caught by the point of the toe and either forced downward or upward. If the arm $j$ is forced downward by the point of the toe being directed upward, as shown in red, fig. 6, the surface of the table H will be inclined inward, and the recoil of the spring-arm $j$ will tilt the point of the toe downward as it leaves the toe, thus leaving the latter in a position for causing the table H to incline outward at the next revolution of the carriage A. By this simple contrivance the proper inclinations of the bolt-table are obtained with certainty.

If it is desired to have the table maintain a horizontal position for sawing stuff of an even thickness for making boxes and for other purposes, it is only necessary to loosen the blocks $g$ $g'$ and drop them down to the position shown in fig. 6, thus disconnecting shaft $h$ from the pendent arm of the table H.

In the drawings, fig. 1, I have represented but four bolt holes through the rotating carriage. In practice these holes will be arranged concentrically around this carriage at proper distances apart, and each hole will be provided with clamps and spring-arms, as above described. The ledges $s$, at the back edges of the bolt holes, serve as supports for the bolts, and relieve the dogs from undue strain while the saw cuts off the shingles or slabs. The saw-shaft D should have a drum upon it for receiving the driving-belt that communicates motion to the machine from an engine.

Having thus described my invention, what I claim as new, and desire to secure by Letters Patent, is—

1. The manner shown and described of constructing the movable dogs of two parts, $e$ $e'$, jointed together and held so by a plate, substantially as described.

2. The arrangement of the tripping-toe $k$ and a spring-arm, $j$, acting upon an oscillating-shaft, $h$, to which the extension-arm H' of said table is attached, all constructed and operating substantially as described.

3. The spring-arm $j$, in combination with the rock-shaft $h$ and tripping-toe, substantially as and for the purpose described.

4. The combination of the forked arm H$^1$ of the bolt-table H, oscillating-shaft $h$, adjustable block $g$, and saw D', substantially in the manner and for the purpose described.

5. The arrangement of the wheels $a$ $a$, internally-toothed plate A A', spur-wheel C, shaft C', saw and shaft D D', belt $b$, central shaft E, cam $c$, retractor I, dogs $e$ $e$, curved way G, spring-arms $d$ $d$, and pivoted table H, all constructed and operating substantially in the manner described.

6. The arrangement of the circular internally-toothed plate A A', oscillating-bed H H', saw D, cam $c$, retractor I, dogs $e$ $e$, spring-levers $d$ $d$, blocks $g$ $g'$, rock-shaft $h$, spring-arm $j$, tripping-toe $k$, loaded arm $m$, and weighted arm $l$ $w$, all constructed and operating substantially in the manner and for the purpose described.

7. A circular-sawing machine constructed and operating on the principle herein described, which is capable at the will of the operator of being made to saw stuff of equal or unequal thicknesses substantially as set forth.

Witness my hand in matter of my application for a patent for improved shingle machine.

ELIJAH R. OSGOOD.

Witnesses:
    EDW. SCHAFER,
    HENRY SYLVESTER.